United States Patent
Kiyohara et al.

(10) Patent No.: US 12,547,892 B2
(45) Date of Patent: Feb. 10, 2026

(54) CONTROL DEVICE, LITHOGRAPHY APPARATUS, AND ARTICLE MANUFACTURING METHOD

(71) Applicant: CANON KABUSHIKI KAISHA, Tokyo (JP)

(72) Inventors: Naoki Kiyohara, Tokyo (JP); Naoki Kita, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 833 days.

(21) Appl. No.: 17/872,178

(22) Filed: Jul. 25, 2022

(65) Prior Publication Data

US 2023/0034598 A1 Feb. 2, 2023

(30) Foreign Application Priority Data

Jul. 30, 2021 (JP) .................................. 2021-126047

(51) Int. Cl.
*G06N 7/01* (2023.01)
*G06N 3/08* (2023.01)

(52) U.S. Cl.
CPC ................. *G06N 3/08* (2013.01); *G06N 7/01* (2023.01)

(58) Field of Classification Search
USPC ........................................ 716/51, 52, 53, 54
See application file for complete search history.

(56) References Cited

U.S. PATENT DOCUMENTS

| 2020/0201290 A1 | 6/2020 | Bischoff |
| 2020/0333752 A1 | 10/2020 | Doerr |
| 2022/0269185 A1* | 8/2022 | Kurihara ............... G03F 7/0002 |

FOREIGN PATENT DOCUMENTS

| CN | 1052981 A | 7/1991 |
| CN | 107422615 A | 12/2017 |
| CN | 112016611 A | 12/2020 |
| DE | 102005010027 B4 * | 8/2007 | ....... G05B 19/41885 |
| EP | 3660744 A1 | 6/2020 |
| JP | 2005-084834 A | 3/2005 |
| JP | 2013-242761 A | 12/2013 |
| JP | 2017-208386 A | 11/2017 |
| JP | 2019071405 A | 5/2019 |
| JP | 2020-098538 A | 6/2020 |
| WO | 2021/081445 A1 | 4/2021 |

OTHER PUBLICATIONS

Button, R.S et al., "Reinforcement Learning: An Introduction" MIT Press, Cambridge, MA (Mar. 1998), pp. 1-7.
(Continued)

*Primary Examiner* — Brian Ngo
(74) *Attorney, Agent, or Firm* — Carter, DeLuca & Farrell LLP

(57) ABSTRACT

A control device controls an object to be controlled. The device includes a generator configured to generate a probability distribution used to determine a manipulated variable, and a determinator configured to determine the manipulated variable based on the probability distribution generated by the generator. In an operation phase, the determinator determines the manipulated variable in accordance with an expectation value of the probability distribution.

15 Claims, 10 Drawing Sheets

(56) References Cited

OTHER PUBLICATIONS

Notice of Reasons for Refusal issued by the Japanese Patent Office on Mar. 31, 2025 in corresponding JP Patent Application No. 2021-126047, with English translation.
Chinese Office Action issued by the China National Intellectual Property Administration on Jul. 17, 2025 in corresponding CN Patent Application No. 202210902358.8, with English translation.
Baxter, J. et al., "Experiments with Infinite-Horizon, Policy-Gradient Estimation" arXiv:1106.0666v2 (Nov. 2019) pp. 1-31.
Korean Office Action issued in corresponding KR Patent Application No. 10-2022-0087915, dated Nov. 20, 2025, with English translation.

* cited by examiner

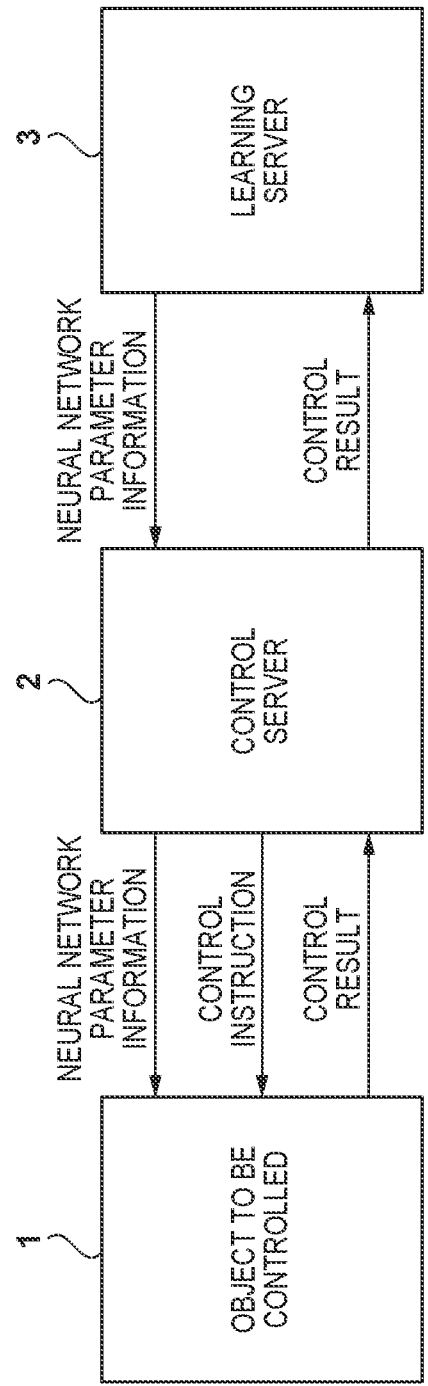
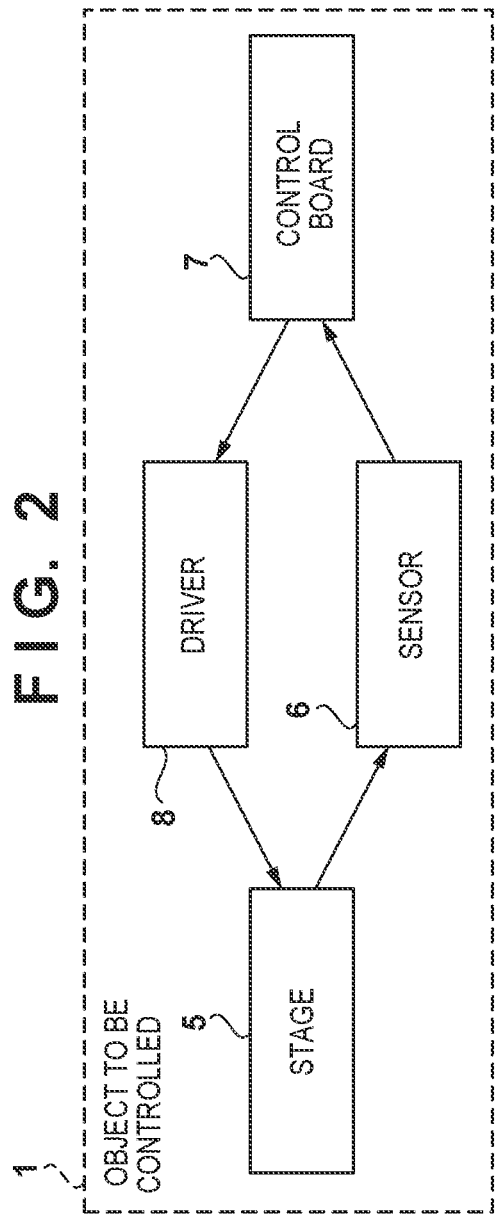

CONTROL DEVICE, LITHOGRAPHY APPARATUS, AND ARTICLE MANUFACTURING METHOD

BACKGROUND OF THE INVENTION

Field of the Invention

The present invention relates to a control device, a lithography apparatus, and an article manufacturing method.

Description of the Related Art

When learning a policy for maximizing a total reward by reinforcement learning, one of a continuous space and a discrete space can be selected as an action space in accordance with the constrain of an algorism and the property of the environment. When discrete action space is selected, an e greedy algorism (non-patent literature 1, patent literature 1), a Softmax method (non-patent literature 1), or the like is generally used as the action policy during searching. As the action policy during operation, a greedy algorism is generally used.

The performance of a controller that outputs a probability distribution used to determine a manipulated variable can be improved by performing learning using a method in which the manipulated variable is determined by sampling according to a random number. However, in actual operation, if a controlled variable is determined by sampling using a random number as in learning, the stochastic behavior can affect quality assurance. Therefore, in general, it is continued to select the manipulated variable that maximizes the probability value. On the other hand, when it is continued to select the manipulated variable having the maximum probability, the control performance may deteriorate as compared to a case of determining the manipulated variable by sampling using a random number.

CITATION LIST

Patent literature 1: Japanese Patent Laid-Open No. 2020-98538
Non-patent literature 1: Sutton, R. S., Barto, A. G.: "Reinforcement Learning: An Introduction." MIT Press, Cambridge, MA (1998)

SUMMARY OF THE INVENTION

The present invention provides a technique advantageous in suppressing a deterioration of the control performance during operation as compared to the control performance during learning.

One of aspects of the present invention provides a control device for controlling an object to be controlled, the device comprising: a generator configured to generate a probability distribution used to determine a manipulated variable; and a determinator configured to determine the manipulated variable based on the probability distribution generated by the generator, wherein in an operation phase, the determinator determines the manipulated variable in accordance with an expectation value of the probability distribution.

Further features of the present invention will become apparent from the following description of exemplary embodiments with reference to the attached drawings.

BRIEF DESCRIPTION OF THE DRAWINGS

FIG. 1 is a view illustrating the configuration of a system according to an embodiment;

FIG. 2 is a view showing a configuration example of an object to be controlled in a case in which the system shown in FIG. 1 is applied to a stage control device;

DESCRIPTION OF THE EMBODIMENTS

Figure 3:
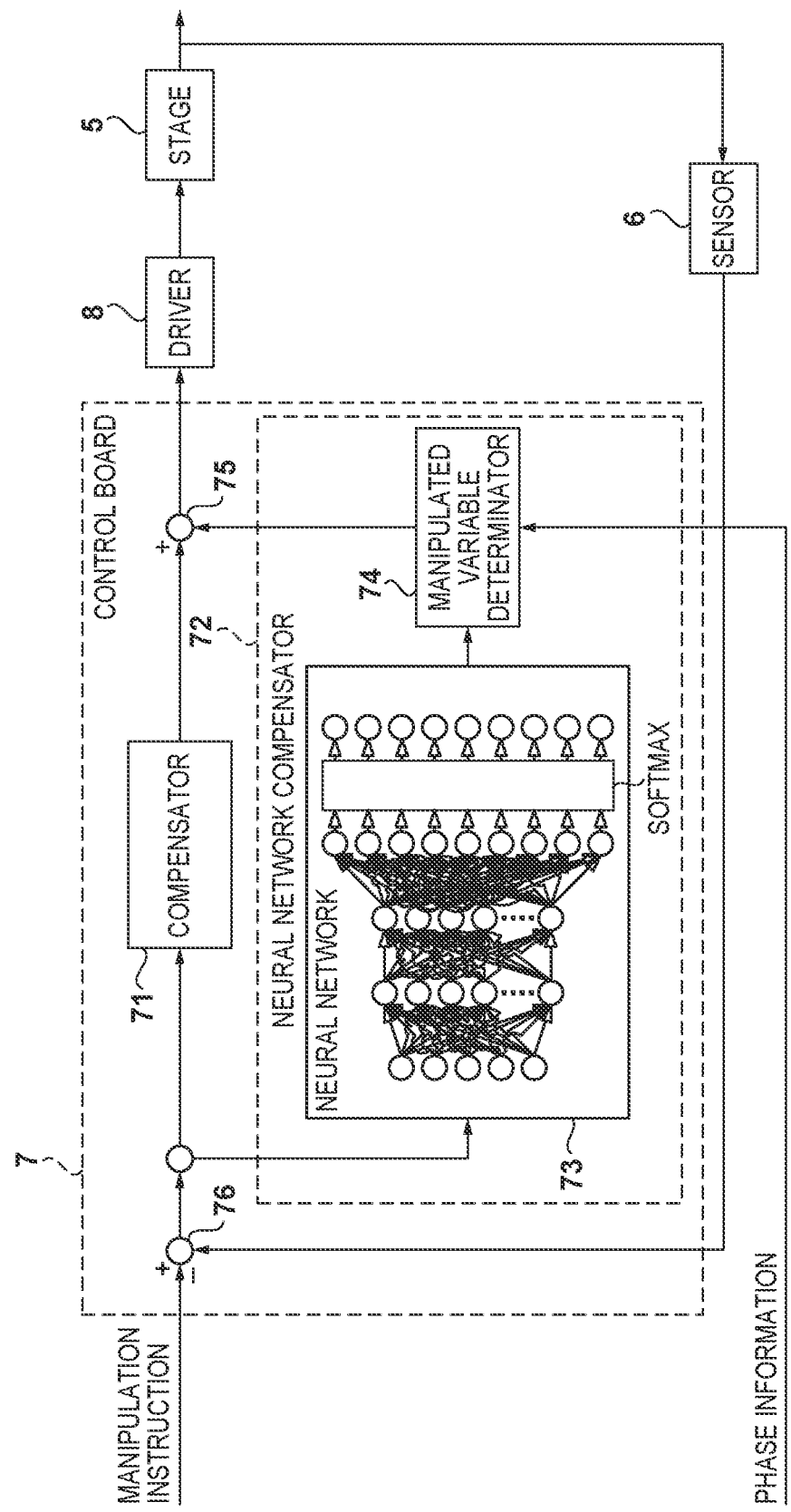
FIG. 3 is a block diagram showing a more specific configuration example of the stage control device shown in FIG. 2.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 illustrates the configuration of a system according to an embodiment. This system can include an object 1 to be controlled, a control server 2 that controls the object 1 to be controlled, and a learning server 3 that performs learning by acquiring a control result from the object 1 to be controlled via the control server 2. The learning server 3 can transmit, to a neural network formed inside the object 1 to be controlled, parameter information of the neural network via the control server 2. Then, the control server 2 can transmit a control instruction to the object 1 to be controlled, and acquire a control result from the object 1 to be controlled. The control result acquired by the control server 2 from the object 1 to be controlled can be transmitted from the control server 2 to the learning server 3. In accordance with the control result, the learning server 3 can calculate a reward indicating the quality of the parameter value of the neural network, and update the parameter value of the neural network based on the reward.

Since the calculation cost related to update of the parameter value of the neural network is high, it is advantageous to configure the control server 2 and the learning server 3 independently. In the configuration in which the control server 2 and the learning server 3 are independent, when there are a plurality of objects to be controlled, it is possible to perform an operation by preparing a plurality of the learning servers 3 each having a high calculation cost, and one control server 2 having a low calculation cost.

FIG. 2 shows a configuration example of the object 1 to be controlled in a case in which the system shown in FIG. 1 is applied to a stage control device. The object 1 to be controlled can include a stage 5, a sensor 6, a control board 7, and a driver 8. The control board 7 can be configured to supply a current instruction to the driver 8 at predetermined time intervals. The driver 8 includes a current driver and an actuator. The current driver can supply a current corresponding to the current instruction to the actuator, and the actuator can drive the stage 5. An operation of the stage 5 is observed (detected) by the sensor 6, and an observation result can be supplied to the control board 7.

FIG. 3 shows a more specific configuration example of the stage control device shown in FIG. 2. The control board (controller) 7 can include, for example, a subtractor 76, a compensator 71, a neural network compensator 72, and an adder 75. The control board 7 can receive a manipulation instruction supplied from the control server 2, position information of the stage 5 supplied from the sensor 6, and phase information supplied from the control server 2. The position information of the stage 5 is an example of state information indicating the state of the stage 5. The subtractor 76 can calculate the difference between the manipulation instruction supplied from the control server 2 and the position information supplied from the sensor 6, that is, the deviation, and supply the deviation to the compensator 71 and the neural network compensator 72. The compensator 71 generates a first manipulated variable based on the deviation supplied from the subtractor 76, and supplies the first manipulated variable to the adder 75.

The neural network compensator 72 generates a second manipulated variable based on the difference supplied from the subtractor 76, and supplies the second manipulated variable to the adder 75. The neural network compensator 72 can include a neural network 73, and a manipulated variable determinator 74 (determinator) that determines the second manipulated variable. The neural network 73 can output, based on the deviation supplied from the subtractor 76, a probability distribution used to determine the second manipulated variable. The neural network 73 may be understood as a component that outputs, based on the deviation supplied from the subtractor 76, a function which defines the probability distribution used to determine the second manipulated variable. The neural network 73 may be understood as a probability distribution generator (generator) that generates the probability distribution used to determine the second manipulated variable.

The manipulated variable determinator 74 determines the second manipulated variable based on the probability distribution or the function, which defines the probability distribution, supplied from the neural network 73 and the phase information supplied from the control server 2. A possible value of the phase information can include a value indicating a learning phase in which the parameter value of the neural network is learned, and a value indicating an operation phase in which control is performed using the parameter of the neural network for which learning is completed. A method of determining a manipulated variable by the manipulated variable determinator 74 will be described later. The compensator 71 and the neural network compensator 72 may be understood as a first compensator and a second compensator, respectively.

The adder 75 adds the first manipulated variable supplied from the compensator 71 and the second manipulated variable supplied from the neural network compensator 72, thereby generating a manipulated variable (combined manipulated variable). The adder 75 supplies the manipulated variable to the driver 8 as a current instruction. As has been described above, the driver 8 includes the current driver and the actuator. The current driver can supply a current corresponding to the current instruction to the actuator, and the actuator can drive the stage 5. Note that the deviation supplied to the neural network compensator 72 is not necessarily the deviation of the position information. For example, the deviation of the velocity, the acceleration, or the jerk may be used.

Figure 4:
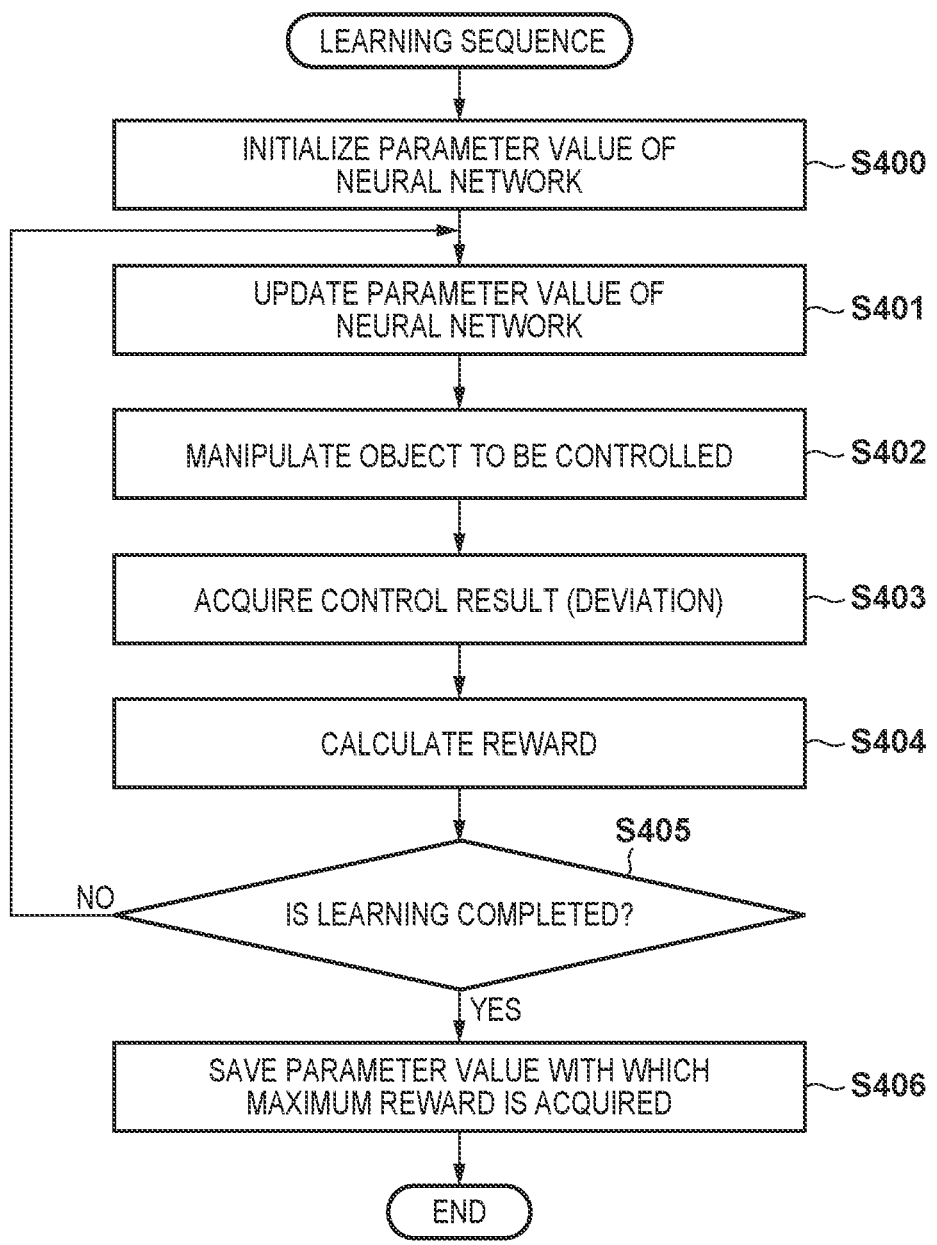
FIG. 4 is a flowchart illustrating a method of determining a parameter value of a neural network by reinforcement learning.

A neural network parameter value (to be simply referred to as a parameter value hereinafter) of the neural network 73 is required to be determined by some learning method in advance. An example of the learning method is reinforcement learning. FIG. 4 illustrates a method (learning sequence) of determining the parameter value of the neural network 73 by reinforcement learning. First, in step S400, the learning server 3 initializes the parameter value of the neural network 73. Then, in step S401, the learning server 3 changes the parameter value of the neural network 73. In step S402, in accordance with predetermined manipulation instruction data (for example, the time-series data of the manipulation instruction), the control board 7 manipulates the stage 5 serving as the object to be controlled.

In step S403, the learning server 3 acquires the control result of the stage 5 serving as the object to be controlled, for example, the deviation data (for example, time-series data of the deviation). Here, the control board 7 can provide the control result to the learning server 3 via the control server 2. Then, the learning server 3 calculates a reward based on the deviation data of the object to be controlled. In an example, the smaller the deviation, the higher the reward. Then, the learning server 3 determines whether learning is completed. If it is determined that learning is not completed, the process returns to step S401. If it is determined that learning is completed, the process advances to step S406. In an example, if the number of times of learning is equal to or smaller than a predetermined number of times, the learning server 3 can determine that learning is not completed, and if the number of times of learning exceeds the predetermined number of times, the learning server 3 can determine that learning is completed. In step S401, the learning server 3 can change the parameter value of the neural network 73 so as to increase the reward. In step S406, the learning server 3 saves, as a learning result, the parameter value with which the maximum reward was obtained. In the learning phase, the learning server 3 functions as a setter that sets the parameter value, which defines the operation of the neural network 73 (probability distribution generator), based on the control result of the object to be controlled which is controlled in accordance with the second manipulated variable determined by the manipulated variable determinator 74.

Figure 5:
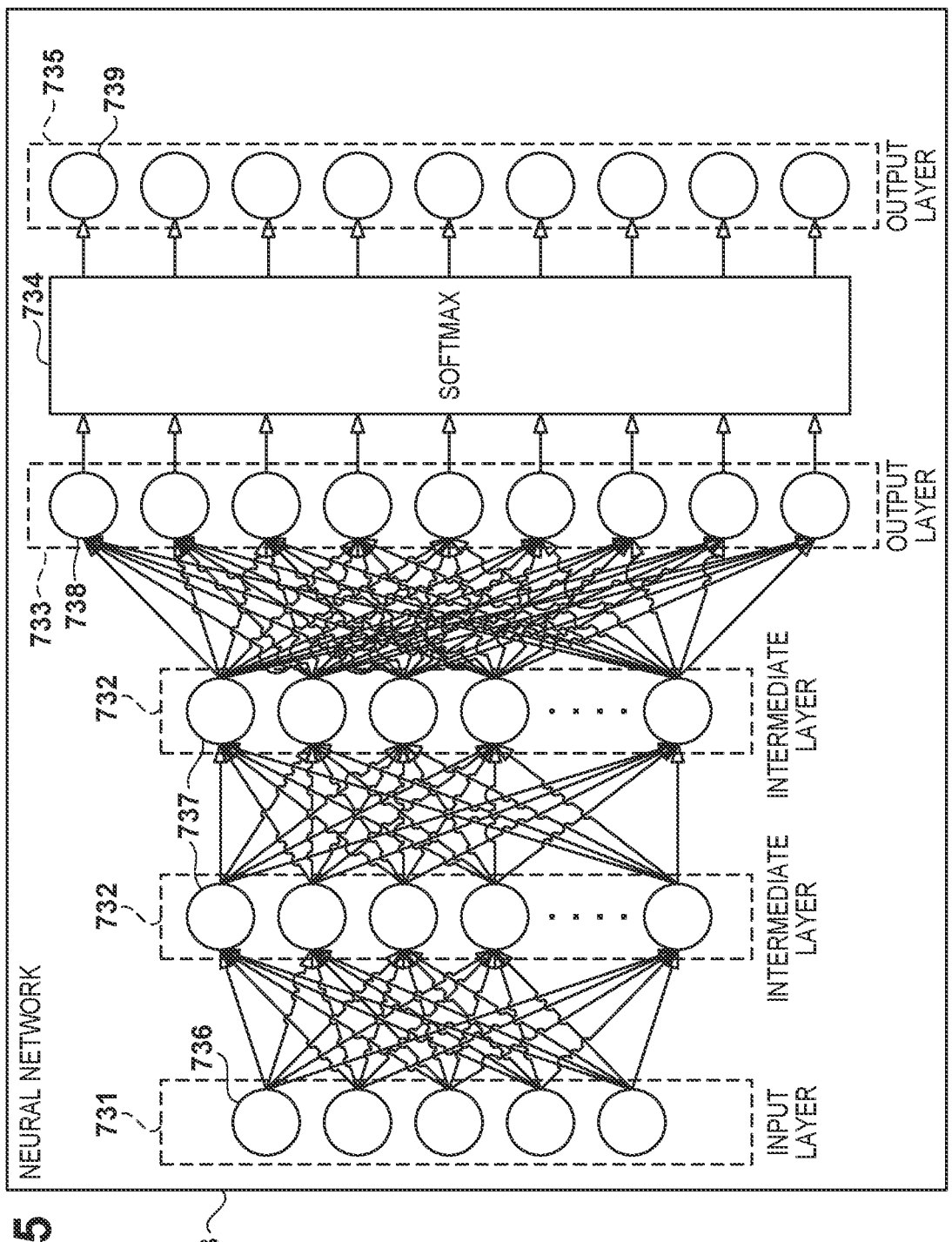
FIG. 5 is a view showing a configuration example of the neural network.

FIG. 5 shows a configuration example of the neural network 73. The neural network 73 can include an input layer 731, one or a plurality of intermediate layers 732, an output layer 733, a function 734, and an output layer 735. The input layer 731 can input, as input data 736, the deviations for past $N_a$ control cycles including the current control cycle. In response to the input, output data 738 of the output layer 733 can be determined via the one or plurality of intermediate layers 732. The output layer 738 can have $N_b$ numeric values (probabilities). The function 734 is, for example, a Softmax function. The function 734 can generate, as output data 739 of the output layer 735, the probability mass function obtained by converting each of the $N_b$ numeric values of the output layer 738 into a normalized probability. The function 734 functions as a converter that converts the output of the neural network 73 into the probability mass function.

In the learning phase, learning is performed using a reinforcement learning method such as Proximal Policy Optimization (PPO hereinafter) including a policy network, and the manipulated variable can be determined by generating a sample according to the probability mass function of the output data 739. For sampling from the probability distribution expressed by the probability mass function, for example, a pseudo-random number generation algorithm such as an inverse transform method or an MCMC method can be used. With this, it is possible to perform learning while performing a searching action.

After the learning phase is completed, in the operation phase in which the parameter value for which the learning phase is completed or the parameter value with which the maximum reward was obtained is used, the manipulated variable having the highest probability of the output data 739 after conversion is generally selected. However, in a system that shows a transient response, such as a low-pass filter in stage control or the like, the accumulated value of the manipulated variables can influence the stage response. Therefore, the reward obtained by continuing to select the manipulated variable having the maximum probability may decrease as compared to the reward obtained when performing sampling from the probability mass function in the learning phase.

To prevent this, in this embodiment, an effect similar to that in the learning phase can be obtained in the operation phase when an expectation value, which is a sum of products of each manipulated variable candidate and the probability thereof, is used as the output (that is, the second manipulated variable) of the neural network compensator 72.

Figure 6:
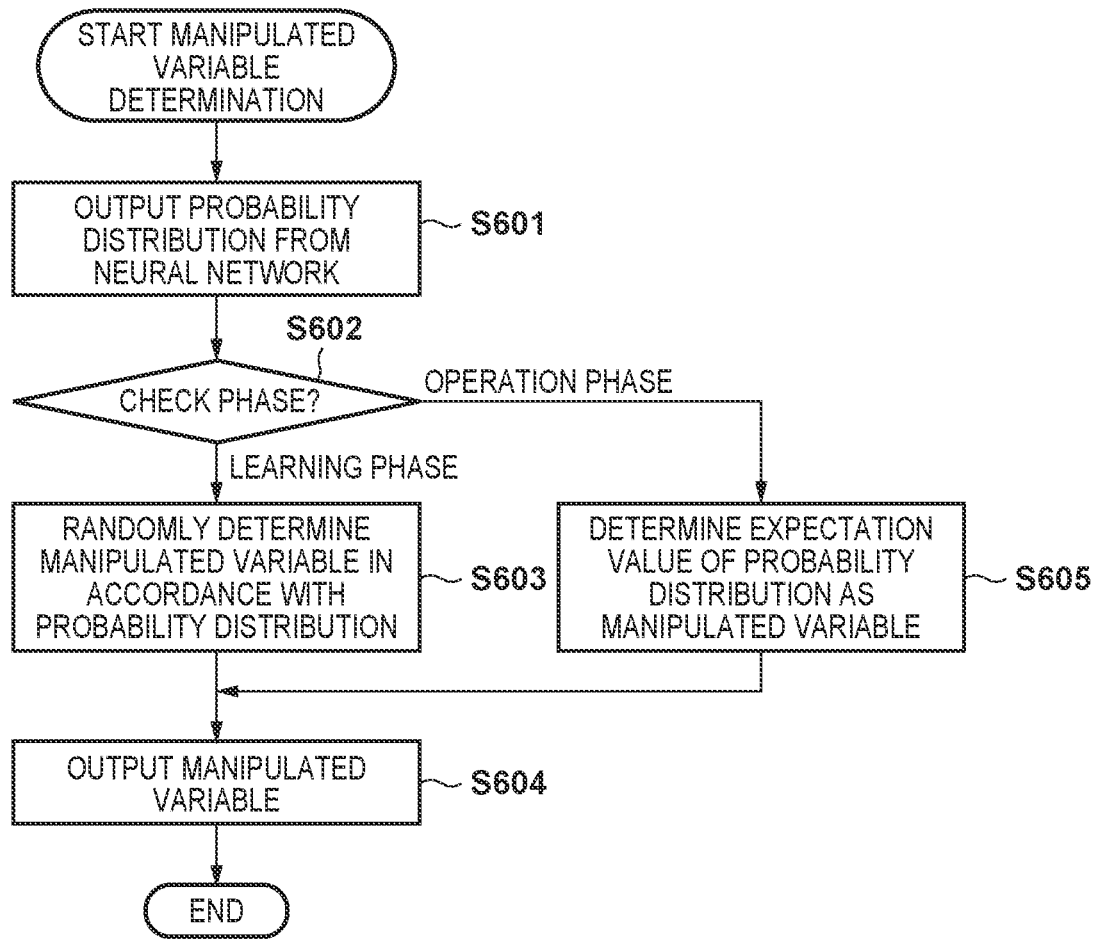
FIG. 6 is a flowchart illustrating an operation of a neural network compensator.

FIG. 6 illustrates an operation of the neural network compensator 72. First, in step S601, the neural network 73 outputs, to the output layer 735, the probability distribution which uses a manipulated variable candidate as a random variable, in other words, the probability distribution used to determine the second manipulated variable. The probability distribution can be, for example, a probability mass function, but may be a probability density function as will be described later. In step S602, the manipulated variable determinator 74 receives the phase information included in the control instruction supplied from the control server 2, and checks the current phase. If the received phase information indicates the learning phase, the manipulated variable determinator 74 advances the process to step S603. If the received phase information indicates the operation phase, the manipulated variable determinator 74 advances the process to step S605.

In step S603, that is, in the learning phase, based on the probability distribution (temporarily set probability distribution) output to the output layer 735 of the neural network 73, the manipulated variable determinator 74 randomly determines the value of the random variable as the second manipulated variable. In step S605, that is, in the operation phase, the manipulated variable determinator 74 determines the second manipulated variable in accordance with the expectation value of the probability distribution output to the output layer 735 of the neural network 73. In step S604, the manipulated variable determinator 74 outputs the second manipulated variable determined in step S603 if it is in the learning phase, and outputs the second manipulated variable determined in step S605 if it is in the operation phase.

Here, during execution of the process shown in FIG. 4, that is, the method (learning sequence) of determining the parameter value of the neural network 73, steps S601, (S602), S603, and S604 in the process shown in FIG. 6 are performed in step S402.

Figure 7:
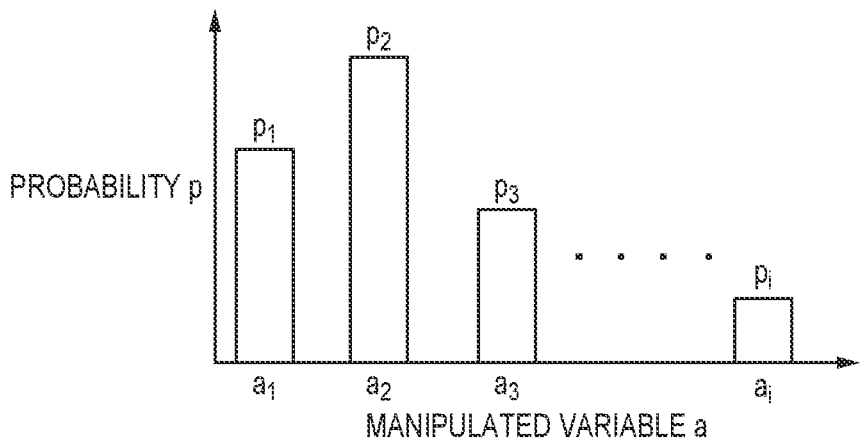
FIG. 7 is a graph illustrating a probability distribution (probability mass function)

A method (step S605) of determining the manipulated variable in the operation phase will be exemplarily described below. Here, $N_b$ manipulated variable candidates $a_i$ (i=0 to $N_b$) are defined. A probability $p_i$ assigned to each manipulated variable candidate $a_i$ appears as the output data 739 of the output layer 735. FIG. 7 illustrates the relationship between the manipulated variable candidate $a_i$ and the probability $p_i$, that is, the probability distribution (probability mass function). An expectation value E determined in step S605 is the expectation value of the probability distribution output to the output layer 735 of the neural network 73. The expectation value E is a sum of products of $a_i$ and $p_i$, and expressed by:

$$E = \sum_{i=0}^{N_b} p_i * a_i \tag{1}$$

Figure 8:
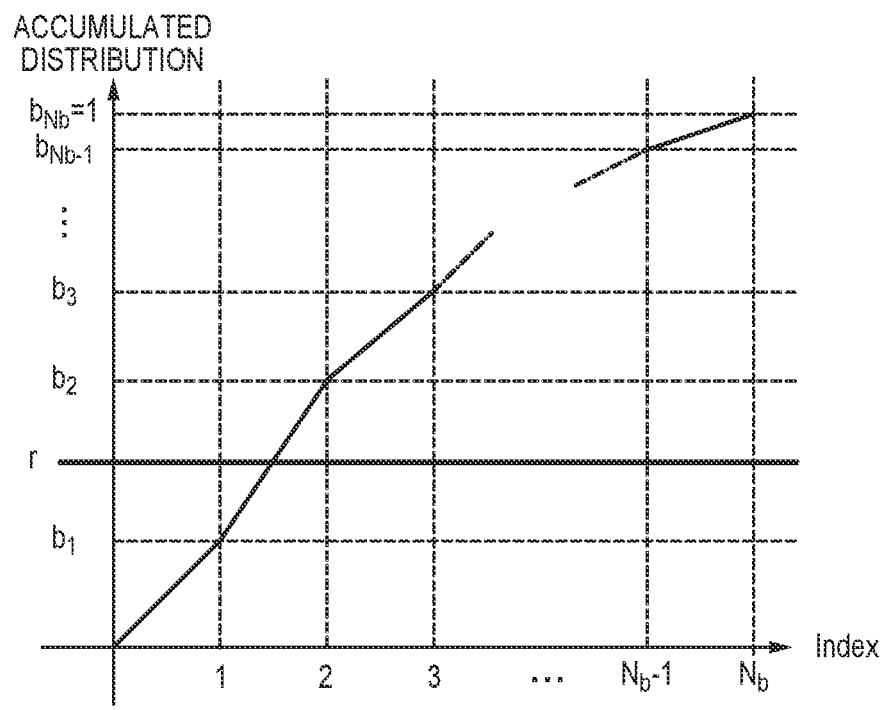
FIG. 8 is a view illustrating a sampling method using an inverse transform method.

A method (step S603) of determining the manipulated variable in the learning phase will be exemplarily described below. Here, as an example, an inverse transform method will be described with reference to FIG. 8. Consider a probability mass function where a[i] indicates the probability of selecting the ith manipulated variable candidate. An accumulated distribution function b[i] is defined as:

$$b[i] = \Sigma_{j=0}^{i} a[j] \tag{2}$$

A sample from the probability distribution expressed by the probability mass function can be obtained by using a continuous uniform random number r in a section [0, 1] and selecting the minimum i that satisfies r≤b[i]. That is, based on the probability distribution, the value of the random variable can be randomly determined as the second manipulated variable.

As the learning method used in the learning phase, in addition to the reinforcement learning method such as PPO including a policy network, a reinforcement learning method such as Deep Q Network (DQN) including no policy network may be used. In this case, the deviations of the manipulation instructions for past $N_a$ control cycles including the current control cycle are input as the input data 736 of the input layer 731. The scores of $N_b$ manipulated variable candidates can be obtained as the output data 738 of the output layer 733 via the one or plurality of intermediate layers 732. By converting, using the specific function 734 such as a Softmax function, the score of the manipulated variable candidate into the probability of the manipulated variable candidate, the output data 739 of the output layer 735 can be generated.

Figure 9:
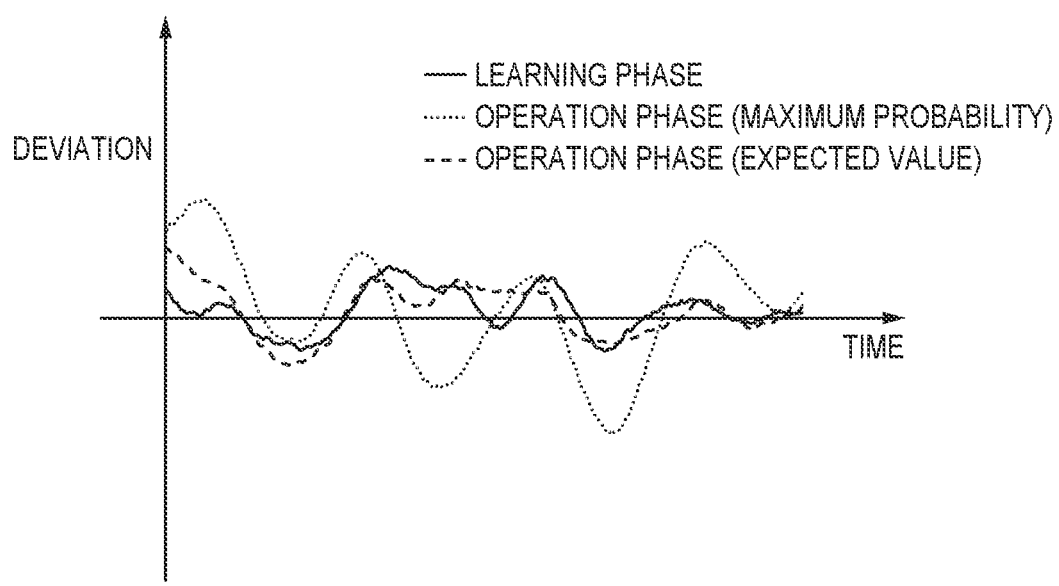
FIG. 9 is a graph illustrating responses of a stage.

FIG. 9 illustrates responses of the stage 9. A solid line indicates the deviation of the stage 9 in the learning phase. A dotted line indicates the deviation of the stage 9 in a case in which the manipulated variable candidate having the highest probability is output as the second manipulated variable in the operation phase. A dashed line indicates the deviation of the stage 9 in a case in which the expectation value of the probability distribution output to the output layer 735 of the neural network 73 is output as the second manipulated variable according to this embodiment. As can be seen from FIG. 9, if the manipulated variable candidate having the highest probability is output as the second manipulated variable in the operation phase, the waveform deteriorates as compared to the waveform in the learning phase. On the other hand, as can be seen from FIG. 9, if the expectation value is output as the second manipulated variable in the operation phase, the waveform similar to the waveform in the learning phase can be obtained.

As has been described above, in a system that shows a transient response, such as a low-pass filter in stage control or the like, by using the expectation value as the output in the operation phase of the neural network that performs discrete output, a deviation suppression effect similar to that in the learning phase can be obtained.

Figure 10:
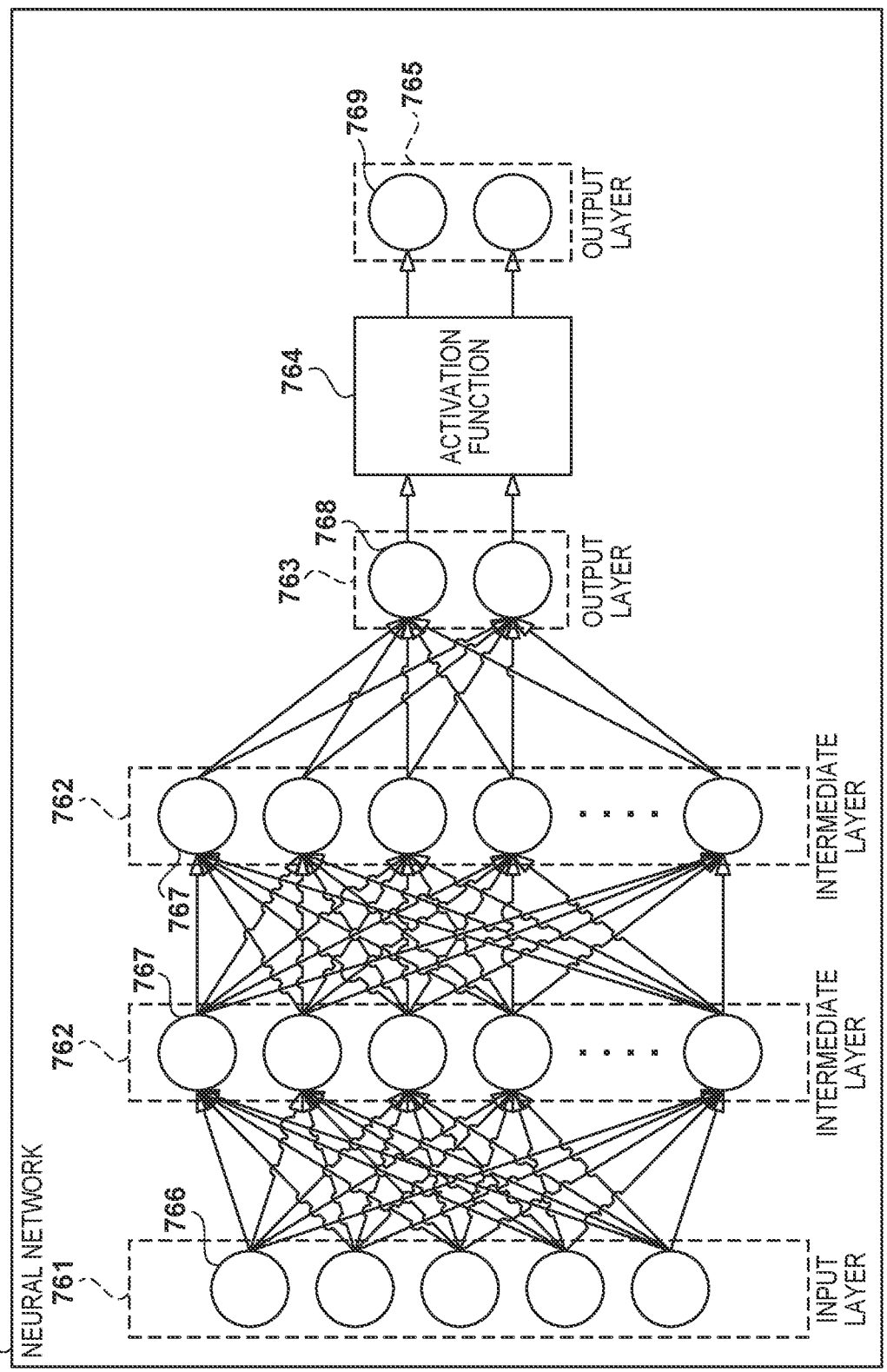
FIG. 10 is a view showing another configuration example of the neural network.

The neural network 73 described above is merely an example, and may be replaced with a neural network 303 as illustrated in FIG. 10. The neural network 303 can include an input layer 761, one or a plurality of intermediate layers 762, an output layer 763, a function 764, and an output layer 765. The input layer 761 can input, as input data 766, the deviations for past $N_a$ control cycles including the current control cycle. As output data 769 of the output layer 765 via the one or plurality of intermediate layers 762, the output layer 763, and the activation function 764, coefficients $\alpha$ and $\beta$ of the $\beta$ distribution, which is one kind of a probability density function, can be determined. When determining the second manipulated variable, the $\beta$ distribution expressed by the coefficients $\alpha$ and $\beta$ is scaled to the range [Fmin, Fmax] of the second manipulated variable.

In the learning phase, learning is performed using a reinforcement learning method such as PPO including a polity network, and the second manipulated variable can be determined by generating a sample according to the probability density function. For sampling from the probability distribution expressed by the probability density function, an appropriate pseudo-random number generation algorithm such as an inverse transform method or an acceptance-rejection method can be used in accordance with the kind of the probability density function. With this, it is possible to perform learning while performing a searching action. On the other hand, in the operation phase in which the parameter value for which the learning phase is completed or the parameter value with which the maximum reward was obtained is used, the above-described scaling is performed on the manipulated variable candidate having the highest probability in the $\beta$ distribution expressed by the coefficients $\alpha$ and $\beta$, which is the output data 769, and the obtained value can be used as the output. However, as has been described above, in a system that shows a transient response, such as a low-pass filter in stage control or the like, the accumulated value of the manipulated variables influences the stage response. Therefore, the reward obtained by continuing to select the manipulated variable having the maximum probability may decrease as compared to the reward obtained when performing sampling from the probability density function in the learning phase. To prevent this, the second manipulated variable is determined in accordance with the expectation value E of the $\beta$ distribution expressed by:

$$E = \frac{\alpha}{\alpha + \beta} \quad (3)$$

For example, by performing the above-described scaling on the expectation value E described above, the second manipulated variable can be determined. With this, an effect similar to that in the learning phase can be obtained. The manipulated variable determinator 74 operates as described above. A reinforcement learning method including no policy network may be used as the learning method used in the learning phase.

As has been described above, even when a neural network that outputs continuous values is used in a system that shows a transient response, such as a low-pass filter in stage control or the like, by using the expectation value as the output in the operation phase, a deviation suppression effect similar to that in the learning phase can be obtained.

Figure 11:
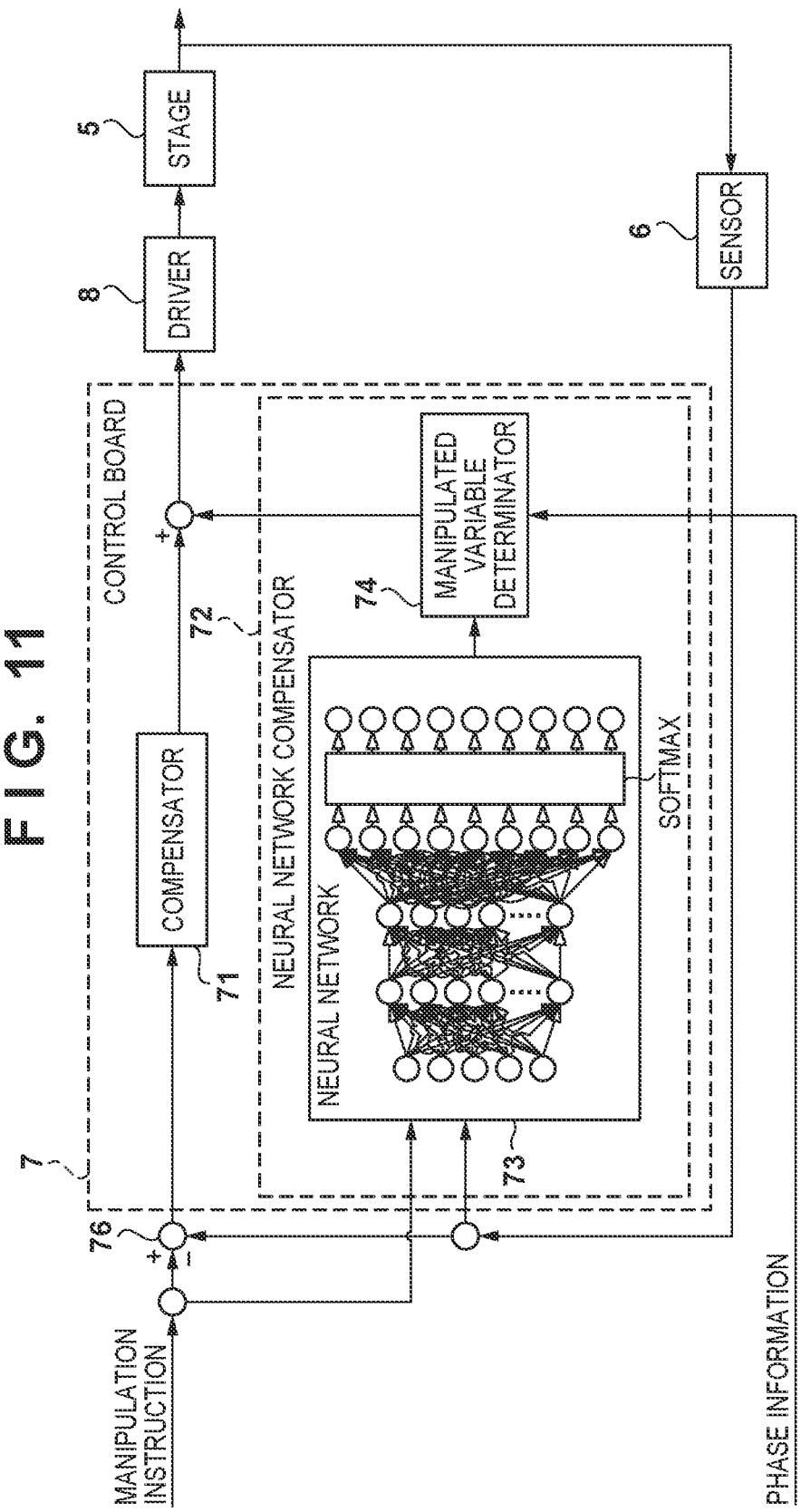
FIG. 11 is a view showing another specific configuration example of the stage control device.

FIG. 11 shows another specific configuration example of the stage control device. In the example described above, the difference (deviation) between the manipulation instruction and the position information is supplied to the neural network compensator 72 or the neural network 73. However, the quality of a parameter value of the neural network can be determined from a reward calculated based on deviation data of the object to be controlled. Accordingly, the difference (deviation) between the manipulation instruction and the position information is not necessarily input to the neural network compensator 72, but one or both of the manipulation instruction and the position information obtained from an output of the sensor 6 may be input. Note that also in this case, the position information is not necessarily input to the neural network compensator 72. For example, the velocity, the acceleration, or the jerk may be input. Also in this configuration, in the operation phase, the second manipulated variable can be determined in accordance with the expectation value of the probability distribution output from the neural network 73. In this manner, even in a case in which the difference (deviation) between the manipulation instruction and the position information is input to the neural network compensator 72, by using the expectation value of the probability distribution as the second manipulated variable in the operation phase, a deviation suppression effect similar to that in the learning phase can be obtained.

In the above description, the manipulated variable to be supplied to the driver 8 is generated by adding the first manipulated variable output from the compensator 71 and the second manipulated variable output from the neural network compensator 72, but the compensator 71 is not always necessary. For example, the second manipulated variable output from the neural network compensator 72 may be supplied to the driver 8 intact.

Figure 12:
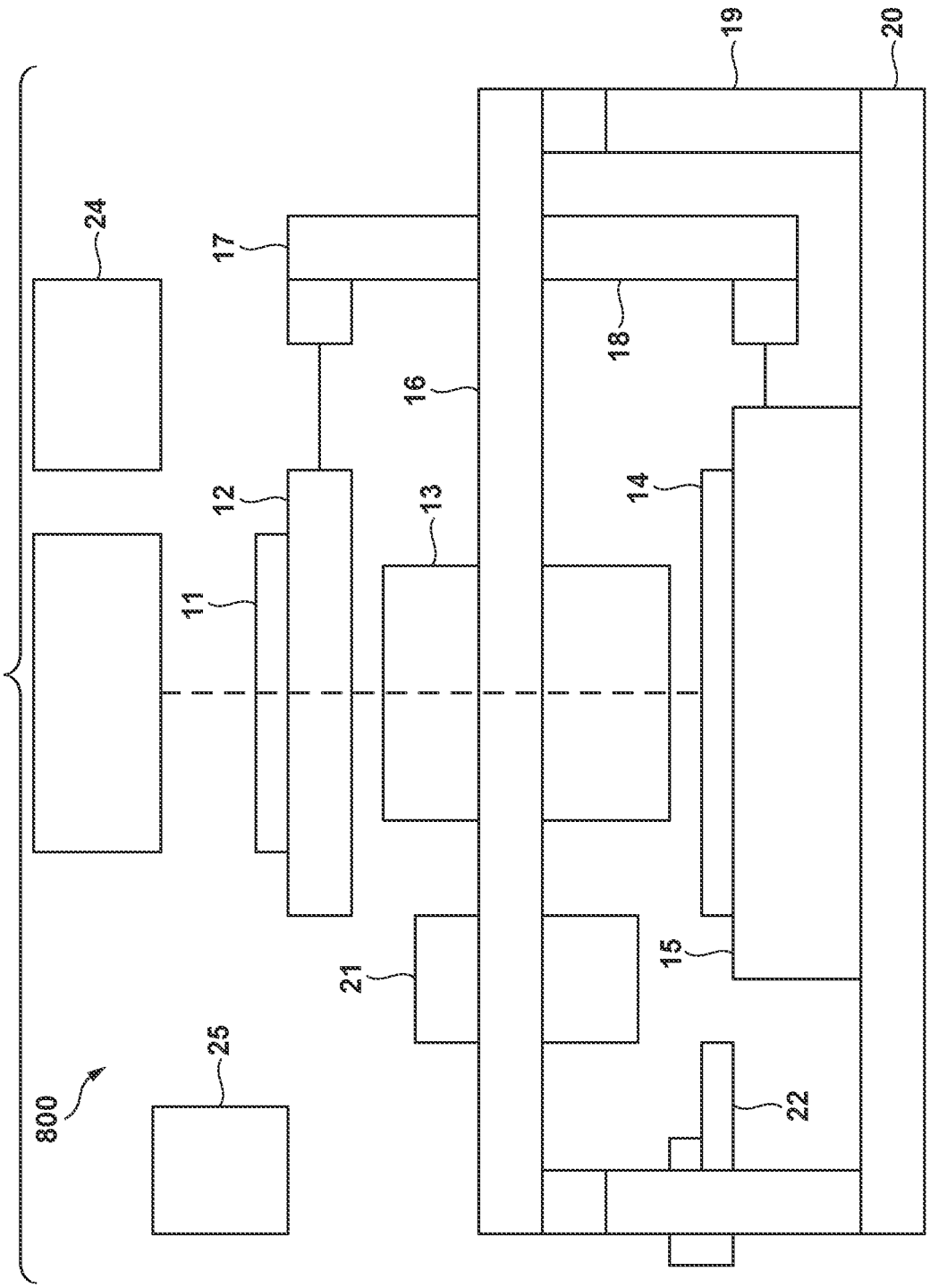
FIG. 12 is a view showing a configuration example of an exposure apparatus as an example of a lithography apparatus.

FIG. 12 shows an example in which the system described above is applied to a scanning exposure apparatus 800 which is an example of a lithography apparatus. The scanning exposure apparatus 800 is a step-and-scan exposure apparatus that performs scanning exposure of a substrate 14 by slit-shaped light shaped using a slit. The scanning exposure apparatus 800 can include an illumination optical system 23, an original stage 12, a projection optical system 13, a substrate stage 15, an original stage position measurement device 17, a substrate stage position measurement device 18, a substrate mark measurement device 21, a substrate conveyor 22, a controller 24, and a temperature controller 25.

The controller 24 can control the illumination optical system 23, the original stage 12, the projection optical system 13, the substrate stage 15, the original stage position measurement device 17, the substrate stage position measurement device 18, the substrate mark measurement device 21, and the substrate conveyor 22. The controller 24 can control a process of transferring a pattern formed in an original 11 to the substrate 14 (a process of performing scanning exposure of the substrate 14). The controller 24 is formed by, for example, a PLD (the abbreviation of a Programmable Logic Device) such as an FPGA (the abbreviation of a Field Programmable Gate Array), an ASIC (the abbreviation of an Application Specific Integrated Circuit), a general-purpose computer installed with a program, or a combination of all or some of these components. The controller 24 also includes a driver that controls an actuator.

The illumination optical system 23 illuminates the original 11. The illumination optical system 23 can shape, using a light shielding member such as a masking blade, light emitted from a light source (not shown) into band-like or arcuate slit-shaped light long in the X direction, and illuminate a part of the original 11 with the slit-shaped light. The original 11 and the substrate 14 are held by the original stage 12 and substrate stage 15, respectively, and are arranged in optically conjugate positions (the object plane and image plane of the projection optical system 13) via the projection optical system 13.

The projection optical system 13 has a predetermined projection magnification (For example, ½ or ¼), and projects the pattern of the original 11 onto the substrate 14 by using the slit-shaped light. A region (a region irradiated with the slit-shaped light) on the substrate 14 onto which the pattern of the original 11 is projected is referred to as an irradiation region. The original stage 12 and the substrate stage 15 are configured to be movable in a direction (Y direction) orthogonal to the optical axis direction (Z direction) of the projection optical system 13. The original stage 12 and the substrate stage 15 are relatively scanned and driven, by drivers (not shown) respectively, at a velocity ratio corresponding to the projection magnitude of the projection optical system 13 in synchronization with each other. Thus, the substrate 14 is scanned in the Y direction with respect to the irradiation region, and the pattern formed in the original 11 is transferred to a shot region on the substrate 14. By sequentially performing the scanning exposure as described above for each of a plurality of shot regions of the substrate 14 while moving the substrate stage 15, an exposure process for one substrate 14 is completed.

The original stage position measurement device 17 includes, for example, a laser interferometer, and measures the position of the original stage 12. For example, the laser interferometer emits a laser beam toward a reflector (not shown) provided on the original stage 12, and detects a displacement (a displacement from a reference position) of the original stage 12 based on the interference between the laser beam reflected on the reflector and the laser beam reflected on a reference surface. The original stage position measurement device 17 can acquire the current position of the original stage 12 based on the displacement. Here, the original stage position measurement device 17 measures the position of the original stage 12 by the interferometer using the laser beam, but the present invention is not limited to this. For example, an encoder may measure the position of the original stage 12.

The substrate stage position measurement device 18 includes, for example, a laser interferometer, and measures the position of the substrate stage 15. For example, the laser interferometer emits a laser beam toward a reflector (not shown) provided on the substrate stage 15, and detects a displacement (a displacement from a reference position) of the substrate stage 15 based on the interference between the laser beam reflected on the reflector and the laser beam reflected on a reference surface. The substrate stage position measurement device 18 can acquire the current position of the substrate stage 15 based on the displacement. Here, the substrate stage position measurement device 18 measures the position of the substrate stage 15 by the interferometer using the laser beam, but the present invention is not limited to this. For example, an encoder may measure the position of the substrate stage 15.

The substrate mark measurement device 21 includes, for example, an image sensor, and can detect the position of a mark provided on a substrate. Here, the substrate mark measurement device 21 of this embodiment detects the mark by the image sensor, but the present invention is not limited to this. For example, a transmissive sensor may detect the mark. The substrate conveyor 22 supplies a substrate to the substrate stage 15 and collects it therefrom. The temperature controller 25 keeps the temperature and humidity within the exposure apparatus constant.

Figure 13:
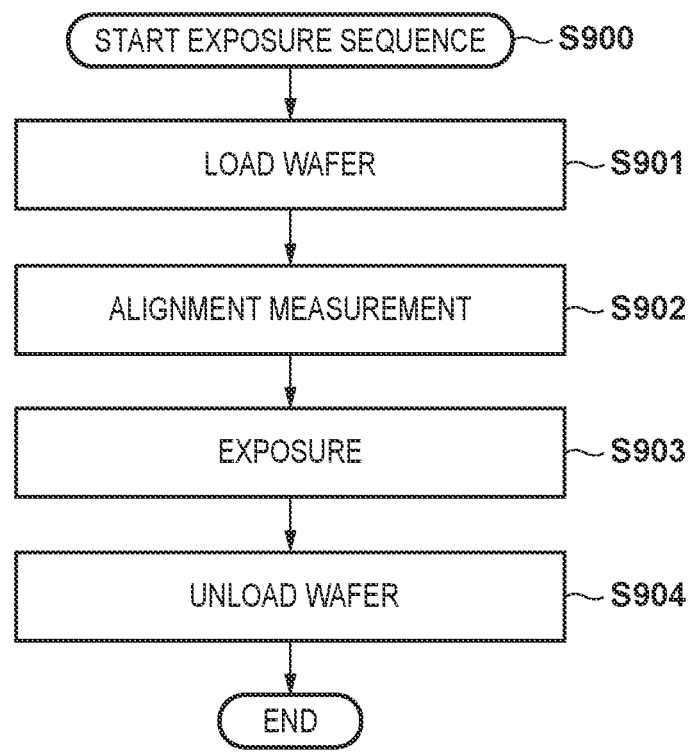
FIG. 13 is a flowchart showing an operation example of the exposure apparatus illustrated in FIG. 12.

FIG. 13 shows an operation example of the exposure apparatus illustrated in FIG. 12. In step S901, the substrate conveyor 22 supplies the substrate 14 onto the substrate stage 15. In step S902, the substrate stage 15 is driven such that a mark on the substrate 14 designated in an exposure recipe enters the measurement field of view of the substrate mark measurement device 21, and alignment of the substrate 14 is performed. In step S903, for each shot region of the substrate 14, scanning exposure of the substrate 14 is performed. The exposure order and exposure angle of view follow the designation by the exposure recipe. In step S904, the substrate conveyor 22 collects the substrate 14 from the substrate stage.

An example in which the system described above is applied to control of the substrate stage (movable portion) 15 will be described below. The sensor 6 shown in FIG. 2 corresponds to the substrate stage position measurement device 18, the control board 7 corresponds to the controller 24, the driver 8 corresponds to a substrate stage driver (not shown), and the stage 5 corresponds to the substrate stage 15. When the system described above is applied to control of the substrate stage 15, a settling time, which is the time until the deviation converges after the substrate stage 15 is driven, can be shortened, so that the accuracy and throughput of the exposure apparatus can be improved. Also in a system for controlling the substrate stage 15, by determining, in the operation phase, the manipulated variable in accordance with the expectation value of the probability distribution used to determine the manipulated variable, a deviation suppression effect similar to that in the learning phase can be obtained.

An example in which the system described above is applied to control of the original stage (movable portion) 12 will be described below. The control board 7 shown in FIG. 2 corresponds to the controller 24, the driver 8 corresponds to an original stage driver (not shown), the sensor 6 corresponds to the original stage position measurement device 17, and the stage 5 corresponds to the original stage 12. Also in a system for controlling the original stage 12, by determining, in the operation phase, the manipulated variable in accordance with the expectation value of the probability distribution used to determine the manipulated variable, a deviation suppression effect similar to that in the learning phase can be obtained.

An example in which the system described above is applied to control of the substrate conveyor (movable portion) 22 will be described below. The control board 7 shown in FIG. 2 corresponds to the controller 24, the driver 8 corresponds to a substrate conveyor driver (for example, AC servo motor) (not shown), the sensor 6 corresponds to a rotary encoder (not shown), and the stage 5 corresponds to the substrate conveyor 22. When the system described above is applied to control of the substrate conveyor 22, a deviation during driving of the substrate conveyor 22 can be suppressed, so that the reproducibility of the supply position upon supplying the substrate 14 to the substrate stage 15 can be improved. Further, by suppressing the deviation while increasing the acceleration and the velocity, it is also possible to improve the throughput. Also in a system for controlling the substrate conveyor 22, by determining, in the operation phase, the manipulated variable in accordance with the expectation value of the probability distribution used to determine the manipulated variable, a deviation suppression effect similar to that in the learning phase can be obtained.

So far, an application to the driving device of each of the substrate stage, the original stage, and the substrate conveyor in the scanning exposure apparatus has been described, but the present invention may be applied to another driving device in the scanning exposure apparatus. The present invention may also be applied to an exposure apparatus that performs exposure while stopping an original and a substrate, or may be applied to another lithography apparatus, for example, an imprint apparatus. Further, the present invention may be applied to another control device that controls an object to be controlled.

Next, an article manufacturing method of manufacturing an article (a semiconductor IC element, a liquid crystal display element, a MEMS, or the like) using the above-described lithography apparatus will be described. The article manufacturing method can include a transfer step of transferring a pattern of an original to a substrate using the lithography apparatus, and a processing step of obtaining an article by processing the substrate to which the pattern has been transferred. When the lithography apparatus is an exposure apparatus, the article manufacturing method can include a transfer step of transferring a pattern of an original to a substrate (a wafer, a glass substrate, or the like) by exposing the substrate with a photosensitive agent applied thereto, and a processing step of obtaining an article by processing the substrate to which the pattern has been transferred. The processing step can include a step of developing the substrate (photosensitive agent). The processing step can further include other known steps, for example, steps for etching, resist removal, dicing, bonding, and packaging. According to this article manufacturing method, a higher-quality article than a conventional one can be manufactured.

Note that the series of embodiments have been described using a stage control device and an exposure apparatus, but a control device having another configuration may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126047, filed Jul. 30, 2021, which is hereby incorporated by reference herein in its entirety.

What is claimed is:

1. A control device for controlling an object to be controlled, the device comprising:
   a generator configured to generate a probability distribution used to determine a manipulated variable; and
   a determinator configured to determine the manipulated variable based on the probability distribution generated by the generator,
   wherein in an operation phase, the determinator determines the manipulated variable in accordance with an expectation value of the probability distribution, and
   wherein in a learning phase, the determinator determines, as the manipulated variable, a value of a random variable randomly determined in accordance with a temporarily set probability distribution.

2. The device according to claim 1, further comprising a setter configured to set, in the learning phase, a parameter value that defines an operation of the generator based on a control result of the object which is controlled in accordance with the manipulated variable determined by the determinator.

3. The device according to claim 1, wherein the probability distribution is a probability mass function.

4. The device according to claim 3, wherein the generator includes a neural network that generates scores of a plurality of manipulated variable candidates.

5. The device according to claim 4, wherein the generator further includes a convertor configured to convert an output of the neural network into the probability mass function.

6. The device according to claim 5, wherein the convertor converts the output of the neural network in accordance with a Softmax function.

7. The device according to claim 1, wherein the probability distribution is a probability density function.

8. The device according to claim 1, wherein the generator receives a difference between a control instruction and state information indicating a state of the object, and generates the probability distribution in accordance with the difference.

9. The device according to claim 1, wherein the generator receives a control instruction and state information indicating a state of the object, and generates the probability distribution based on the control instruction and the state information.

10. The device according to claim 8, wherein the state information is a position of the object.

11. The device according to claim 8, wherein the state information is one of a velocity, an acceleration, and a jerk of the object.

12. The device according to claim 8, further comprising:
a first compensator configured to generate a first manipulated variable based on the difference between the control instruction and the state information; and
an adder configured to generate a combined manipulated variable obtained by adding the first manipulated variable and the manipulated variable determined by the determinator,
wherein the combined manipulated variable is supplied to a driver configured to drive the object.

13. A lithography apparatus for transferring a pattern of an original to a substrate, the apparatus comprising:
a movable portion; and
a control device defined in claim 1, and configured to control the movable portion.

14. The apparatus according to claim 13, wherein the movable portion is one of a substrate stage, an original stage, and a substrate conveyor.

15. An article manufacturing method comprising:
transferring a pattern of an original to a substrate using a lithography apparatus defined in claim 14; and
obtaining an article by processing the substrate to which the pattern has been transferred.

* * * * *